Feb. 18, 1958 E. R. HARRIS 2,823,950
AUXILIARY VISOR
Filed Jan. 31, 1955
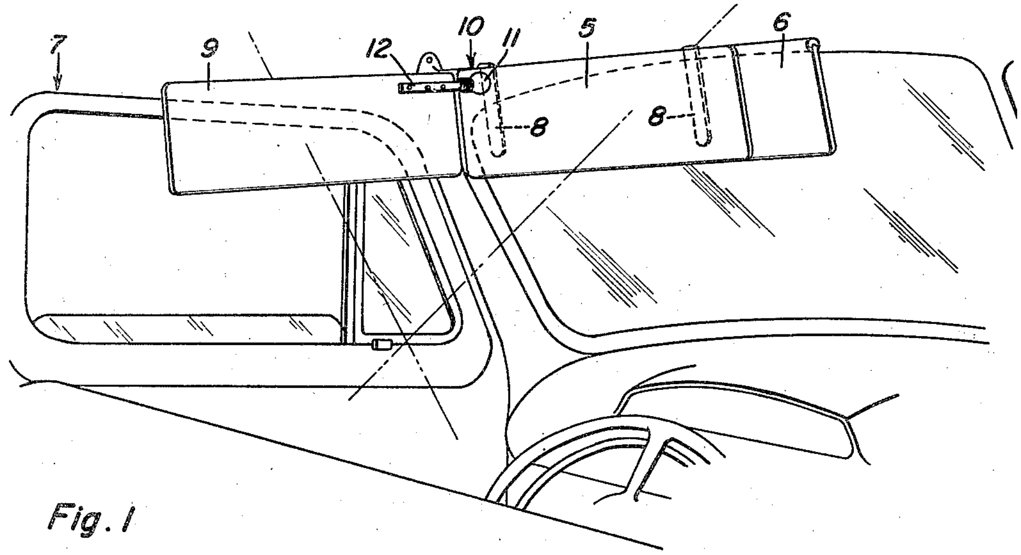
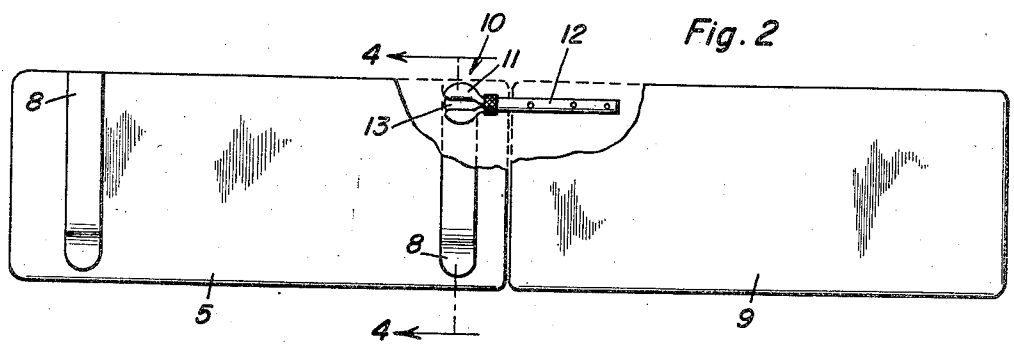
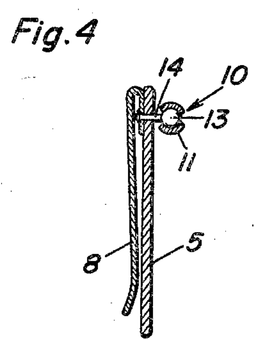
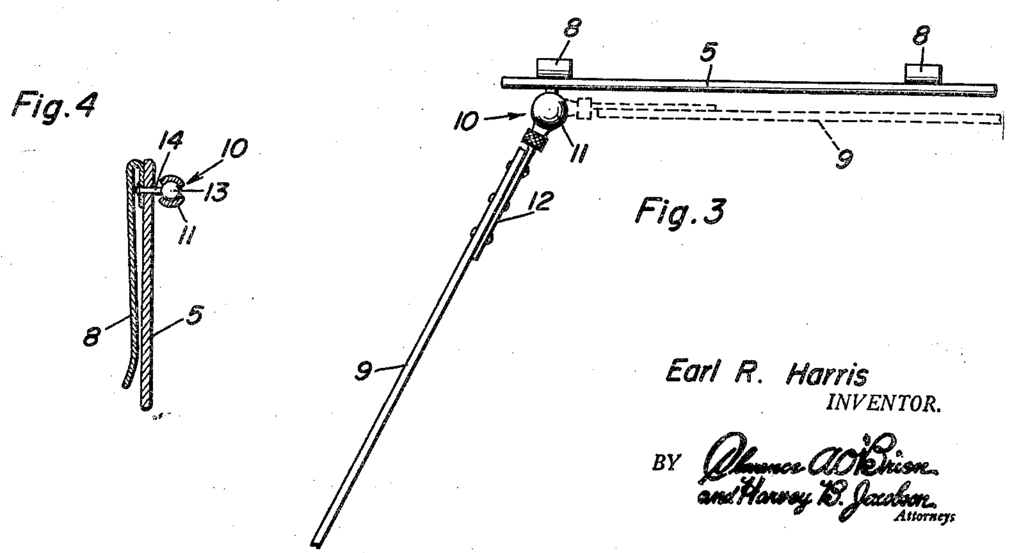
Earl R. Harris
INVENTOR.
BY Clarence A. O'Brien and Harvey B. Jacobson
Attorneys United States Patent Office 2,823,950

Patented Feb. 18, 1958

2,823,950

AUXILIARY VISOR

Earl R. Harris, La Crosse, Wis.

Application January 31, 1955, Serial No. 485,093

1 Claim. (Cl. 296—97)

The present invention relates generally to new and useful improvements in inside visors or glare shields for motor vehicles, and has for its primary object to provide, in a manner as hereinafter set forth, novel means, readily attachable to a standard visor, for shielding the eyes of the operator from left-side glare, thus obviating the necessity of disturbing said standard visor.

Another very important object of the invention is to provide an auxiliary visor of the aforementioned character which is capable of substantially universal swinging adjustment relatively to the standard visor.

Other objects of the invention are to provide an auxiliary visor of the character described which will be comparatively simple in construction, strong, durable, compact and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view, showing an auxiliary visor embodying the present invention installed and in operative position;

Figure 2 is a view in rear elevation of the device with portions of the device broken away;

Figure 3 is a top plan view of the device; and

Figure 4 is a cross-sectional view, taken substantially on the line 4—4 of Figure 2.

Referring now to the drawing in detail, it will be seen that the embodiment of the invention which has been illustrated comprises a substantially rectangular mounting plate 5 of plastic or other suitable material. The plate 5 is adapted to be removably mounted on the front of the usual standard visor 6 of a motor vehicle, as at 7. Toward this end, the plate 5 has fixed on the back thereof, adjacent its ends, a pair of metallic clips 8 which are adapted to be slipped downwardly over the standard visor 6.

Mounted for swinging adjustment on the upper outer end portion of the plate 5 is a substantially rectangular shield 9 which may also be of plastic or other suitable material. The shield 9 is mounted on the plate 5 through the medium of a universal joint 10.

The universal joint 10 includes a split resilient socket 11 on the outer or free end of an arm 12 which is secured longitudinally on the inner end portion of the shield 9. The socket 11 receives and frictionally grips a ball 13 on the plate 5. In the embodiment shown, the ball 13 is fixed on one end of a shank 14 which is mounted on one end portion of the adjacent clip 8.

It is thought that the operation or use of the auxiliary visor will be readily apparent from a consideration of the foregoing. Briefly, when the auxiliary visor is not in use, the shield 9 is swung to a position in opposed parallelism with the mounting plate 5 as shown in dotted lines in Figure 3 of the drawing. When it is desired to protect the eyes from side glare, the shield 9 is swung rearwardly and laterally on the universal joint 10 to the position shown in Figure 1 of the drawing. The universal joint 10 permits the shield 9 to be swung in both horizontal and vertical planes. With the standard and auxiliary visors in operative position, the eyes of the driver will be protected from both forward and side glare. With the shield 9 in the dotted line position of Figure 3 of the drawing, the standard visor 6, with the auxiliary visor thereon, may be readily swung upwardly to inoperative position. It will be observed that the construction of the auxiliary visor is such that it may be readily mounted for use on the usual standard visor or removed therefrom.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claim.

What is claimed as new is as follows:

An auxiliary visor of the character described comprising: a substantially rectangular mounting plate, resilient clips on the back of said plate adjacent the ends thereof and engageable with the back of a standard visor for removably and slidably adjustably securing said plate on the front thereof, a shank on one of said clips passing through the plate, a ball on the shank adjacent the front of the plate, a glare shield, and a split socket on the shield operable on said ball for mounting said shield on said plate for universal adjustment.

References Cited in the file of this patent

UNITED STATES PATENTS

| | | |
|---|---|---|
| 1,513,769 | Sullivan | Nov. 4, 1924 |
| 2,184,360 | Nichols | Dec. 26, 1939 |
| 2,257,612 | Lininger | Sept. 30, 1941 |
| 2,261,881 | Horstmann | Nov. 4, 1941 |
| 2,517,872 | Hamel | Aug. 8, 1950 |